Dec. 18, 1928.
W. WRIGHT
1,695,727
CAR ROOF
Filed Oct. 18, 1924
5 Sheets-Sheet 1
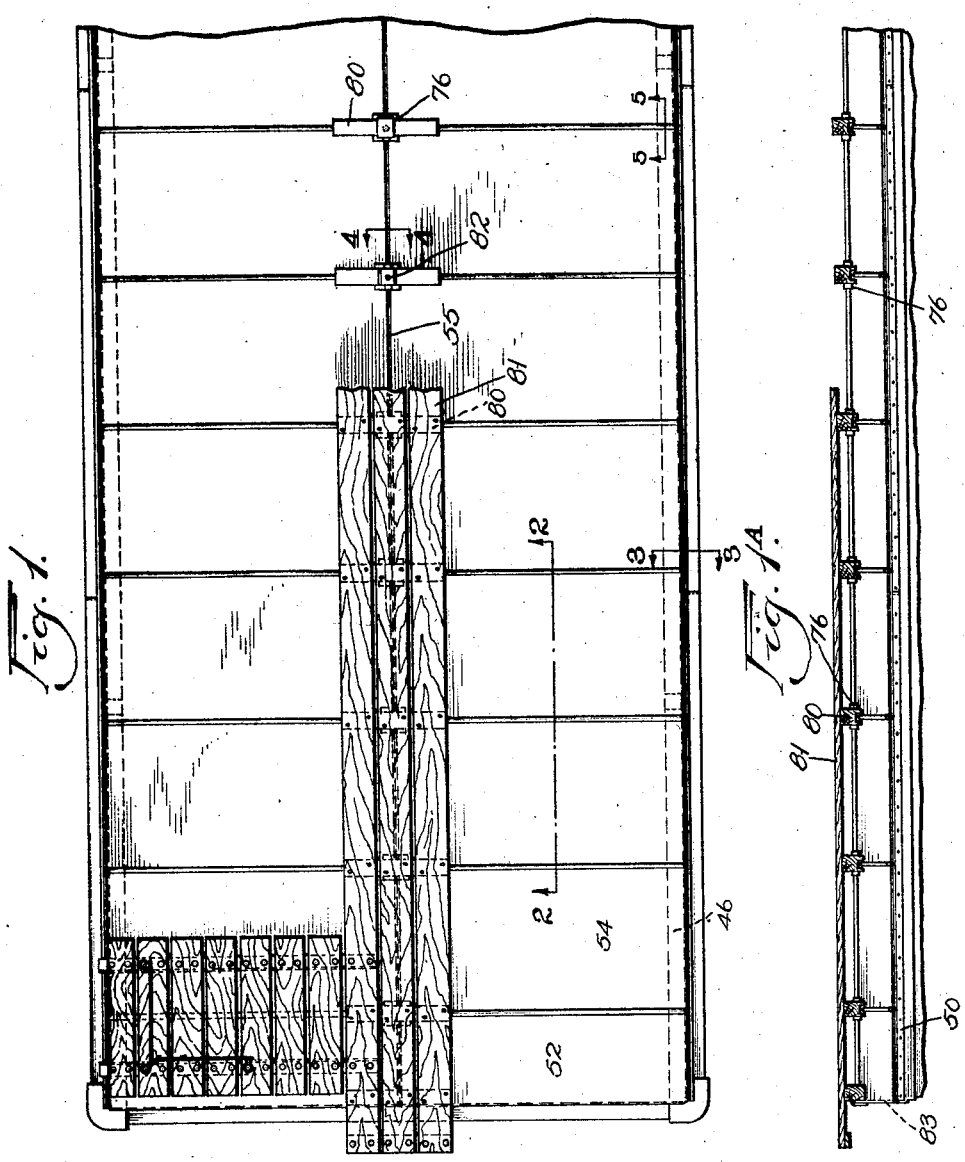
Inventor:
William Wright
By Munday Clark & Carpenter Attys.

Dec. 18, 1928.  W. WRIGHT  1,695,727
CAR ROOF
Filed Oct. 18, 1924   5 Sheets-Sheet 2
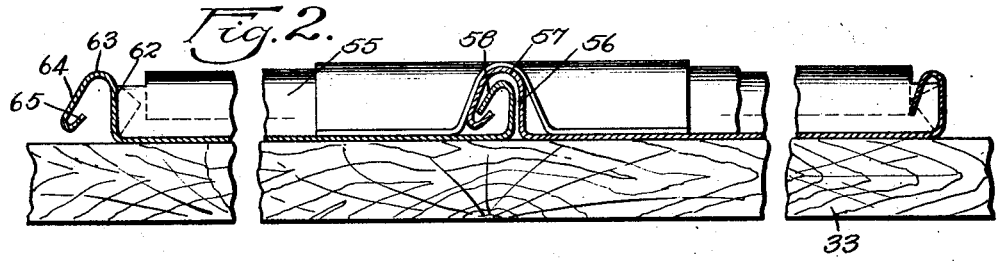
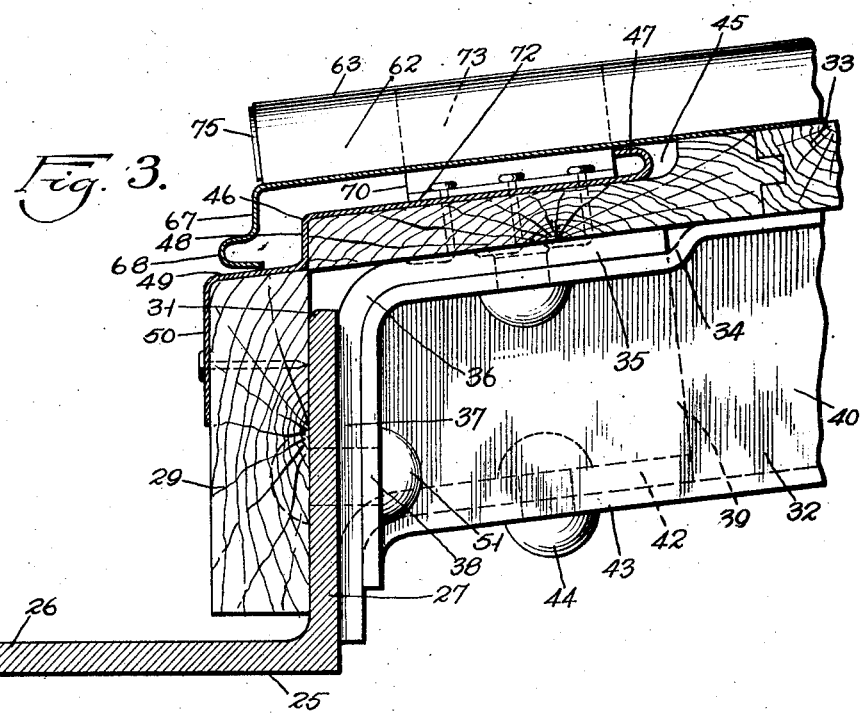
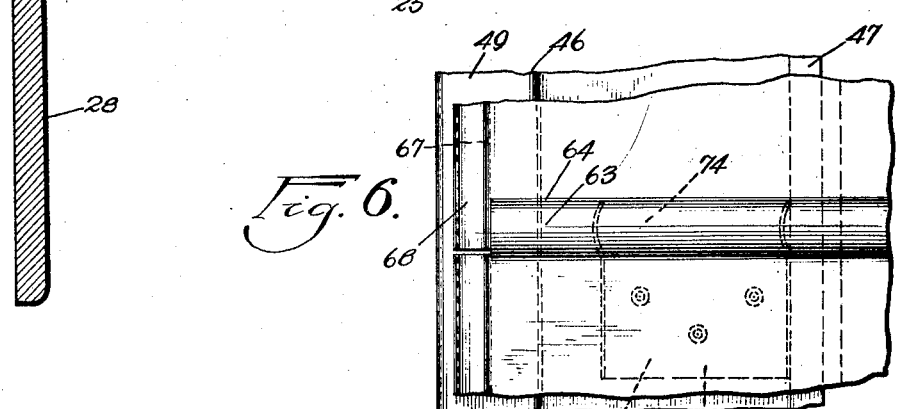
Inventor:
William Wright

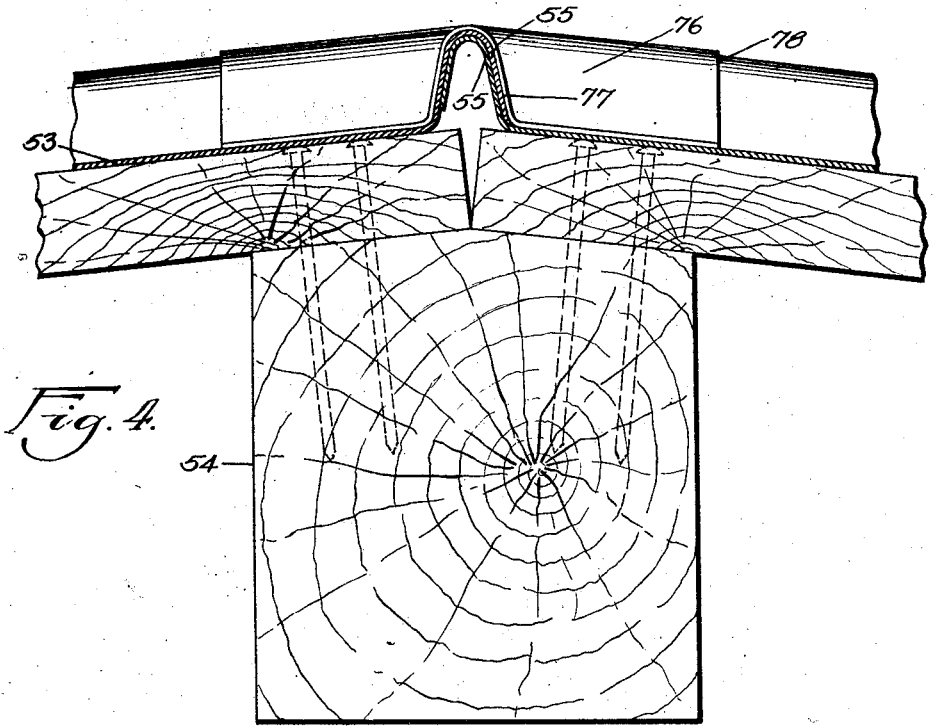
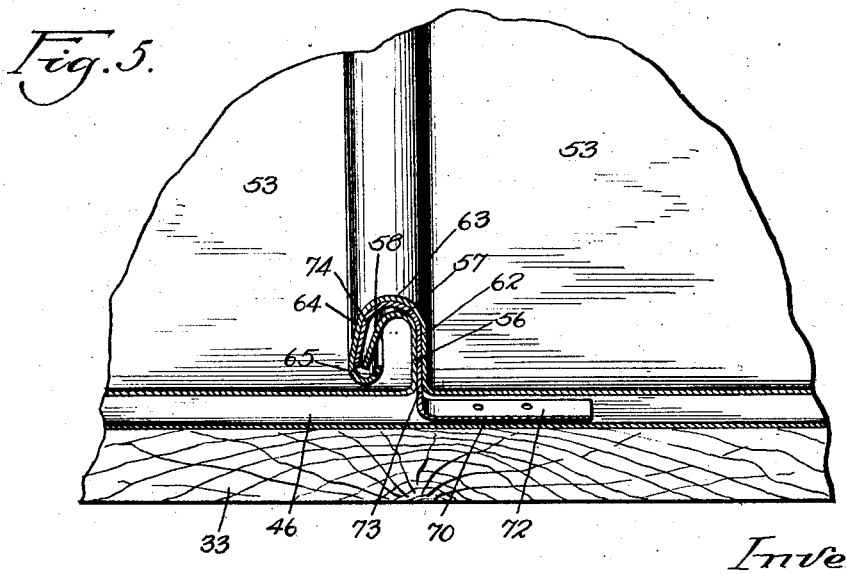

Dec. 18, 1928.
W. WRIGHT
CAR ROOF
Filed Oct. 18, 1924    5 Sheets-Sheet 4
1,695,727
Fig. 7.
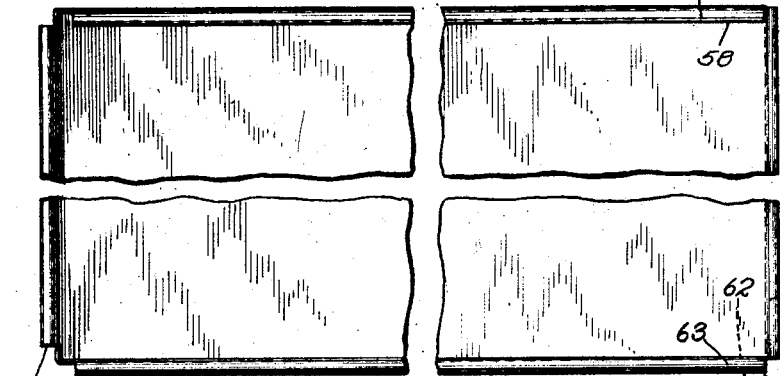
Fig. 9.
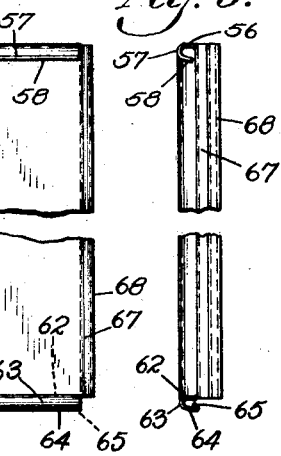
Fig. 8.
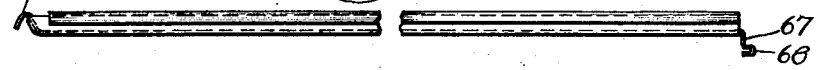
Fig. 10.
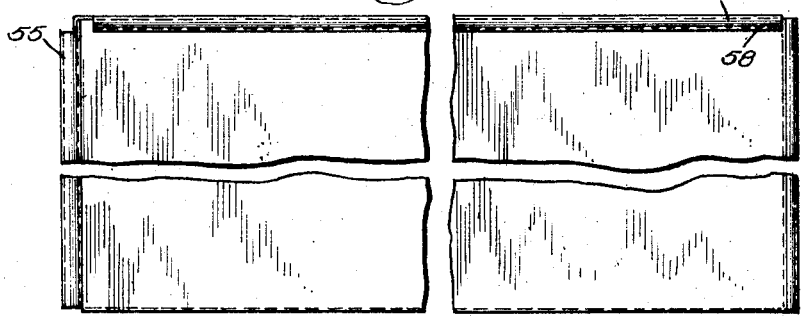
Fig. 11.
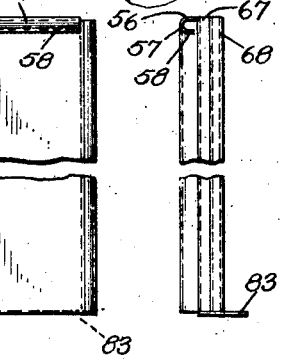
Fig. 12.     Fig. 13.
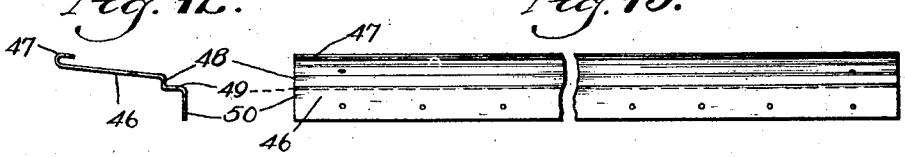
Inventor.
William Wright
By Munday Clarke & Carpenter Attys Dec. 18, 1928.   W. WRIGHT   1,695,727
CAR ROOF
Filed Oct. 18, 1924   5 Sheets-Sheet 5

Inventor:
William Wright

Patented Dec. 18, 1928.

1,695,727

UNITED STATES PATENT OFFICE.

WILLIAM WRIGHT, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE.

CAR ROOF.

Application filed October 18, 1924. Serial No. 744,301.

This invention relates in general to freight car roofs and more particularly to improvements in the type of car roofs generally designated as "outside roofs" which type consists of a metal roof assembled over the usual inside wooden roof of the car, and objects of the invention are the provision of a construction in which the metal parts may float or move in harmony with the weaving and other movements of the roof to which the metallic coverings are subjected, without subjecting the metal parts to constant rubbing and chafing action, especially at such points in the car where the movements are greatest and where leakage is to be especially avoided; the simplification of construction of the various parts, especially at the eaves; the reduction of contacting members, the elimination of the usual outside clips and a special advantage of the invention is the ease and inexpensiveness in manufacture and application of the metal roof to the car, and such other objects and advantages of the invention as may be found to obtain in the structures hereinafter set forth and claimed.

In the accompanying drawings, forming a part of this specification, and showing, for purposes of exemplification, a preferred form and manner in which the invention may be embodied and practiced, but without limiting the claimed invention specifically to such illustrative instance or instances:—

Fig. 1 is a top plan view of a portion of a car roof embodying the invention.

Fig. 1$^A$ is a side elevation of the same.

Fig. 2 is a longitudinal vertical cross sectional view taken on the lines 2—2 of Fig. 1.

Fig. 3 is a vertical transverse sectional view taken on the lines 3—3 of Fig. 1.

Fig. 4 is a vertical transverse cross-sectional view taken on the line 4—4 of Fig. 1.

Fig. 5 is a vertical longitudinal sectional view taken on the line 5—5 of Fig. 1.

Fig. 6 is a top plan view taken over the eaves end of the side seams showing, in dotted lines, the arrangement and position of the anchor.

Fig. 7 is a top plan view of an intermediate roof sheet.

Fig. 8 is a side elevational view of the same.

Fig. 9 is an end elevational view of the same.

Fig. 10 is a top plan view of an end roof sheet.

Fig. 11 is an end elevational view of the same.

Fig. 12 is an end elevational view of the longitudinally extending metallic flashing.

Fig. 13 is a side elevational view of the same.

Figure 14:
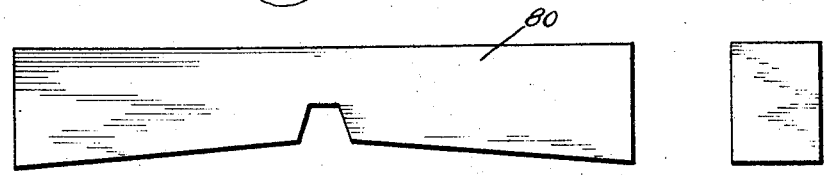
Fig. 14 is a side and end elevational view of one of the running board saddles.
Figure 15:
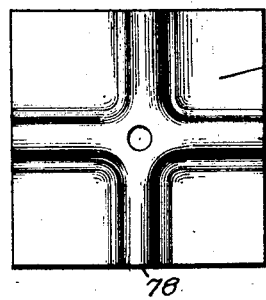
Fig. 15 is a top plan view of a ridge intersection cap.
Figure 16:
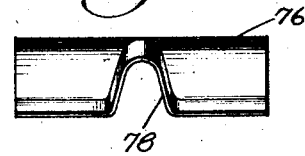
Fig. 16 is a side elevational view of the same.

This invention, as illustrated on the drawings, is embodied in a construction comprising longitudinally extending metallic side plates 25, of the Z-bar type, which are turned on their side and provide a horizontal web 26, an inner upwardly extending upper flange 27 and an outer depending vertical flange 28. To the outer surface of the upper flange 27 is secured a longitudinally extending wooden side fascia 29, the upper edge of which extends a little above the upper edge 31 of the flange 27. Metallic carlines 32 extend transversely of the car, from side plate to side plate, said carlines being formed so as to receive and support a wooden filler strip to which the wooden inside roof boards 33 are secured. At each eaves end the carlines are depressed at 34 to receive and be riveted to the upper and inwardly extending flange 35 of a metallic bracket 36, said bracket 36 having a depending flange 37 arranged between the inner surface of the flange 27 of the side plates 25 and the outer surface of the vertical longitudinally extending flanges 38 of the end of the carlines. The bracket 36 is channeled to fit in the channel at the end of the carlines, the channel of the bracket being defined by sides 39 that fit against the inner surfaces of the sides 40 of the carlines and further defined by a bottom web 42 that fits against the inner surface of the bottom web 43 of the carline to which it is secured by rivets 44.

The wooden roof 33 is gained out at 45 at each eaves edge to receive a longitudinally extending metallic flashing 46, having at its inner side edge an upwardly projecting return bend flange 47, the upper surface of which is below the plane of the top surface of the ungained roof boards 33, and the flashing 46 is bent down at 48 to enclose the eaves edges of the boards 33 and bent outwardly at 49 to enclose the top surface of the side fascia 29, the flashing terminating in a depending flange 50 secured to the outer surface of the side fascia. The carlines are secured to the side plates by suitable means such as rivets 51. Metallic roof sheets enclose the wooden roof 33, said roof sheets consisting of end roof sheet sections 52 and intermediate roof sheet sections 53 that extend from above the point of the ridge pole 54 to the eaves.

Each intermediate roof sheet section consists of a flat body having an inverted U-shaped ridge flange 55, the flanges 55 of adjacent roof sheets disposed on opposite sides of the ridge being lapped one over the other, as shown in Fig. 4.

One side edge of each of the intermediate roof sheet sections is flanged to provide an upwardly extending vertical portion 56 bent inwardly toward the center of the sheet at 57 and terminating in a downwardly extending portion 58 inclined away from the portion 56. The other side edge is flanged upwardly to provide a vertical portion 62 rebent outwardly away from the sheet at 63 and then bent downwardly and outwardly at 64 on an incline away from the portion 62, the portion 64 terminating in an upwardly and inwardly rebent portion 65. When assembled on the roof the portions 62, 63, and 64 are slidably engaged over the portions 56, 57 and 58 respectively of the flange of the next adjacent roof sheet, and said telescoped flanging terminate near the eaves ends of the sheet.

The eaves edges of the roof sheets are flanged downwardly at 67 and said flanges 67 terminate in longitudinally outwardly pressed rigidifying beads 68. To hold the eaves edges of the side seams of the roof sheets down on the car, anchors 70 are provided. Each of said anchors comprising a horizontal base portion 72 secured on the flashing, said base portion supporting a vertical portion 73 which rests against the underlapping flanges, said vertical portion terminating in a substantially curved hook 74 extending downwardly at the opposite side of said vertical portion 73, said hooks 74 engaging the inner surface of the eaves ends of the portions 63 and 64 of the side flanges of the roof sheets. To close the ends of the joined side flanges a portion of the end of 64 is bent over the eaves end of the joined side flanges as indicated at 75. At the ridge corners of the roof sheets, intersection caps 76 are provided, said caps being formed with longitudinal channels 77 that fit over the lapped ridge flanges of the roof sheets and with a channel 78 to fit over the lapped side flanges of adjacent roof sheets. Running board saddles 80 are secured over said ridge corner caps, said saddles supporting the usual running boards 81.

The saddle is secured on the roof by a bolt 82 that passes through the saddle 80, ridge intersection cap 76, between the corners of the four adjacent roof sheets disposed on opposite sides of the ridge and through the wooden inside roof.

Figure 18:
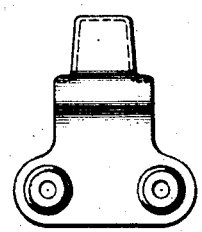
Fig. 18 is an end elevational view of an end ridge cap.
Figure 17:
Fig. 17 is an end elevational view of the same.
Figure 19:
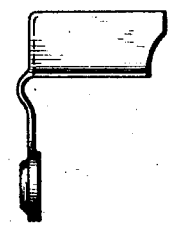
Fig. 19 is a side elevational view of the same.
Figure 20:
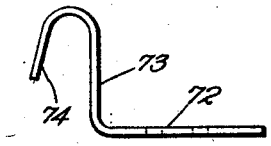
Fig. 20 is an end elevational view of one of the anchors for the eaves ends of the side seams formed by the interconnection of the side flanges of the roof sheets.
Figure 21:
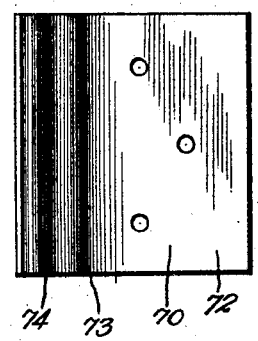
Fig. 21 is a top plan view of the same.

The end roof sheet sections are formed in the same manner as the intermediate sections except one side edge terminates in a depending flange 83. The ridge flanges at each end of the car are closed by cap shown in Figs. 18 and 19.

The invention as hereinabove set forth is embodied in a particular form of construction but may be variously embodied within the scope of the claims hereinafter made.

I claim:

1. A car roof comprising, in combination, side plates, said side plates being connected by transversely extending carlines, a wooden inside roof secured to said carlines, the eaves edge of said inside roof being gained out longitudinally of the roof, a metallic flashing secured in the gained out portion, metallic roof sheets extending from ridge to eaves of the roof, one side of said roof sheets being flanged to provide an upwardly extending portion, said upwardly extending portion being rebent downwardly and inwardly over the sheet, an anchor having a base portion secured on the flashing in the gained out portion of the inside roof, the said base portion being in spaced relation to the general plane of the roof sheets, said anchor having a vertical transversely extending portion and having at its upper end a downwardly and outwardly extending hook engaging the side flange of the adjacent roof sheet, the other side of said sheets being flanged to provide an upwardly extending portion rebent at its upper end downwardly and outwardly away from the body of the sheet, said downwardly extending portion terminating in an inwardly and upwardly extending spaced hook, said last mentioned side flange fitting over the side flanging of the next adjacent sheet which is formed similar to the first mentioned side flange, the eaves edge of said roof sheets terminating in a depending flange.

2. A car roof comprising, in combination: side plates; carlines; a wooden roof secured thereon; said wooden roof being gained out at each eaves edge; a flashing secured on said gained out portion; metallic roof sheets extending from ridge to eaves, the eaves edge of roof sheets being flanged downwardly, one side edge of said roof sheets being provided with upwardly projecting inverted U-shaped flanging arranged over the body of the sheet; the other side edge of said roof sheets being provided with upwardly and outwardly extending inverted U-shaped flanging having an inner return bend hook, said last mentioned flanging slidably engaging the side flanging of the next adjacent roof sheet that is arranged over the body of said sheet; and an anchor engaging said side flanging, the base portion of said anchor being secured to the wooden roof in the gained out portion thereof and the upper part of said anchor being hook shape, said hooked portion engaging the return bend hook portion of the side flanging of the next adjacent roof sheet.

3. A car roof comprising, in combination with a wooden inside roof, metallic roof sheets arranged thereon, the main body portions of said sheets being disposed in substantially the same plane and eaves flanging, one side of said roof sheets having upwardly projecting flanging arranged inwardly over the body of the sheet, and the other side edge having upwardly projecting flanging arranged outwardly from the body of the sheet, the side flanges of adjacent roof sheets slidably engaging each other, an anchor engaging at the eaves edge of the roof the side flanging of the roof sheets to hold them down on the car, said anchor having a base portion secured to the wooden roof in spaced relation to the general plane of the roof sheets.

4. A car roof comprising, in combination: a wooden inside roof being provided adjacent its eaves edge with a gained out portion; metallic roof sheets arranged thereon; said roof sheets having eaves flanging, said eaves flanging consisting of a depending flange terminating below the plane of the gained out portion of the inside roof, one side of said sheets having upwardly projecting inverted channel shaped flanging arranged over and spaced from the body of the sheet, the other side of said sheets having upwardly projecting inverted channel shaped flanging arranged outwardly from the body of the sheet; the side flanges of adjacent sheets being loosely engaged with each other, and an anchor disposed at the eaves ends of said side flanges and enclosed thereby, said anchor having a base portion spaced from the general plane of the roof sheets and secured to the wooden roof in the gained out portion thereof, said anchor having a hooked portion engaging the lapped side flanging to hold the roof sheets down on the wooden roof.

In testimony whereof I have hereunto set my hand.

WILLIAM WRIGHT.